W. F. COCHRANE.
Mower.

No. 60,693.    Patented Jan. 1, 1867.

Witnesses:    Inventor:

United States Patent Office.

WILLIAM F. COCHRANE, OF SPRINGFIELD, OHIO.

Letters Patent No. 60,693, dated January 1, 1867.

IMPROVEMENT IN HARVESTERS.

The Schedule referred to in these Letters Patent and making part of the same.

TO ALL WHOM IT MAY CONCERN:

Be it known that I, WILLIAM F. COCHRANE, of Springfield, in the county of Clark, and State of Ohio, have invented certain new and useful Improvements in Harvesting Machines, of which the following is a full, clear, and exact description, reference being had to the accompanying drawing, making a part of the same, in which—

Similar letters of reference indicate corresponding parts in the several figures.

Figure 1:
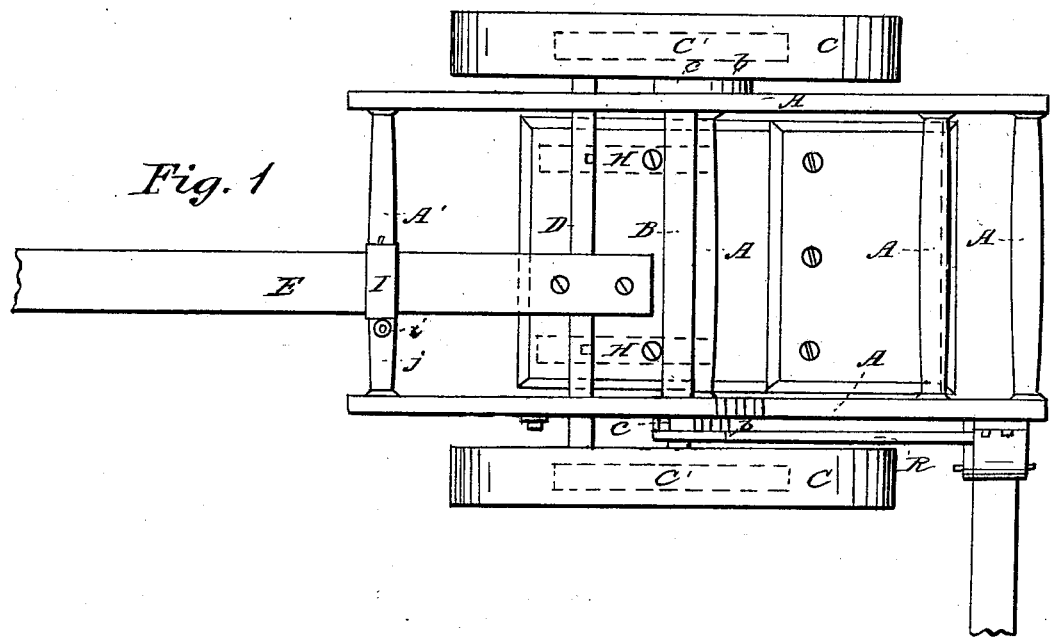
Figure 1 is a plan or top view of a machine illustrating the manner in which said improvements may be carried out.

The invention consists in combining the main frame with the tongue and main axle of the machine in such manner that the frame may be raised and lowered bodily, maintaining its parallelism with the surface of the ground at whatever height therefrom it may be adjusted or set; in the employment of pinions on the axle, which operates as a rock-shaft, through which, by means of geared segments on the segmentally slotted frame, the frame is raised and lowered sliding on the axle; and in the employment of a swinging adjustable yoke in combination with the main frame and hinged tongue, or its equivalent, whereby the movements of the frame, in being raised and lowered to adjust the height of the cutters, may be regulated, as hereinafter described.

In the accompanying drawing, A A¹ represents a main frame composed of side pieces, A A, and transverse bars or girders, A' A', by which the side pieces are held at the desired distance apart, and through which they are firmly connected by bolts passing through the side pieces and through the girders, made tubular for that purpose, or in any other suitable manner. The side pieces A are expanded at any convenient or desired point in their length, in the manner shown in the drawing, and have segmental slots, $a$, formed in them of a suitable width to receive the ends of axle, B, the frame pieces being passed over the ends of said axle and made to abut against shoulders formed by the enlargement of the central portion of the axle, making a hub thereon of a length equal or nearly equal to the length of the transverse bars or girders of the frame, thereby preventing, when the side pieces are bolted together, any lateral movement of the frame on the axle, and assisting in properly bracing and strengthening the frame at that point. Instead of this enlarged central portion or hub on the axle, adjustable collars or other equivalent device may be used. C C are the main drive and supporting wheels, mounted on the opposite ends of axle B, outside of frame A, and in such manner as to revolve freely and independently of each other on said axle. Said wheels are provided with spur-wheels, C' C', which mesh with and drive pinions, D', on the counter-shaft, D, from which motion may be communicated to the cutters in any usual manner. E is the pole or tongue by which the machine is drawn, which is connected at its rear end to the pole plate or frame, F, which also forms the foot support for the driver mounted on seat, G. The plate or frame F is supported on standards, H, which embrace and are free to turn on the axle B. I is a swinging yoke connected to the forward transverse bar of the frame in such manner as to be free to turn thereon, and is made to embrace the tongue in the manner shown. Said yoke is provided with perforations, $i$, by which, through a bolt or pin, $j$, passing through the yoke and through a perforation in the tongue, the length of the yoke, its position on the tongue, the height of the forward end of the frame and of the cutting apparatus from the ground, and the movements of the frame itself in being adjusted up and down, may be regulated in a manner hereinafter explained. $c\ c$ are two pinions, of any desired diameter, keyed or otherwise secured to the axle so as to turn therewith; and K is a lever, also made fast to the axle in such manner that it may be adjusted thereon by a set-screw or other equivalent device, to bring it into convenient position to enable the driver on his seat to operate the same. $b\ b$ are curved racks secured, one on each side piece of the frame. Said racks are of a curvature corresponding with the curvature of the segmental slots in the frame, and both racks and slots are formed in the arc of a circle, of which the counter-shaft D is the centre. L is a swinging rack, by which the lever K, through a pin thereon engaging with the teeth or in the notches in said rack, may be held in any desired position.

Figure 2:
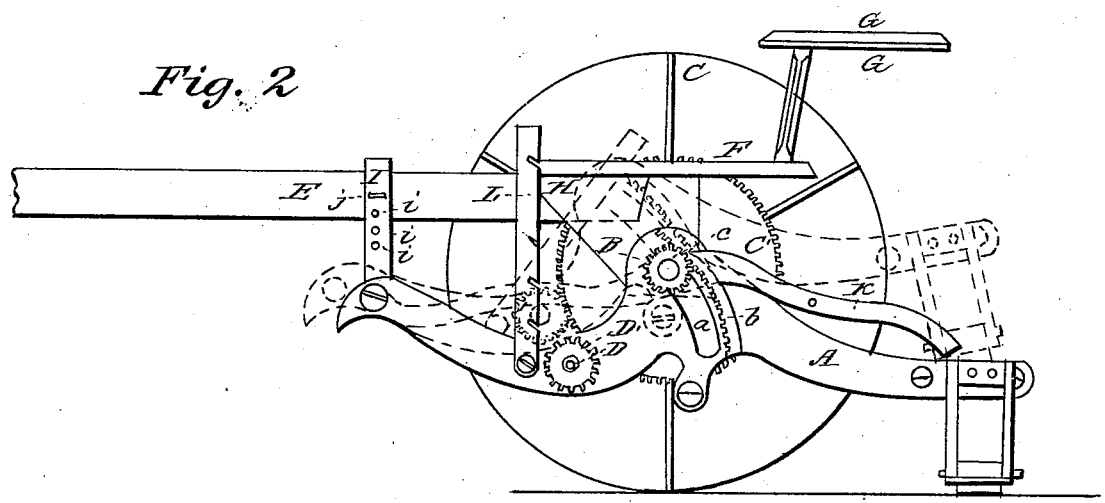
Figure 2 is a side view of the same.
Figure 3:
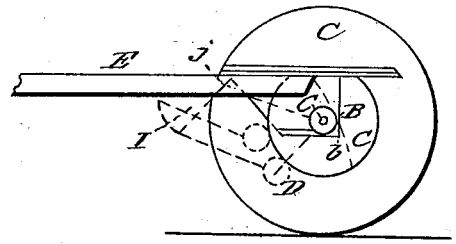
Figure 3 is a diagram illustrating the manner in which the frame operates in being raised and lowered to adapt the cutting apparatus to the work to be performed.

By the construction hereinabove explained, the axle, on which the carrying and driving wheels revolve, is made, by the operation of lever K, to act as a rock-shaft, rotating the pinions $c\ c$ with it, and thereby, through the pinions meshing with the teeth of the curved racks *b*, raising and lowering the frame, causing it to slide up and down on the axle guided in its movements by the segmental slots *a* formed therein, and thereby maintaining always the same distance between the axle and pinion-shaft, and consequently keeping the pinions on the latter always in the proper working relation with the driving-wheels. If the frame were rigidly held at a point coincident with the centre of the pinion-shaft, the movement of the rear end of the frame and of the cutting apparatus, shown in this instance as connected to such rear end, would be in the arc of a circle around such pinion-shaft as a centre; but the forward end of the frame being extended beyond said shaft, and connected by a swinging yoke to a fixed point on the tongue, about which it is free to vibrate, the said forward end is also caused to swing forward and upward as the frame is raised, and downward and rearward as the frame is lowered on the axle, in a path similar to that described by the rear end of the frame. By adjusting the length of the yoke to correspond with the length of the radius of the segmental slots in the frame, or, in other words, by making it equal in length to the distance between the centres of the counter-shaft and axle, and pivoting the same at a point on the tongue at the same distance from the axle that the point of attachment thereof to the frame is from the counter-shaft, in the manner shown by the diagram, fig. 3, the frame will be raised and lowered bodily, in the arc of a circle, in a manner similar to the action of a parallel rule, and as clearly shown in the diagram. By varying the length of the yoke, or its point of attachment to the tongue, in a manner shown in fig. 2 of the drawing, the movement of the frame and cutting apparatus may be varied from the parallel movement described; the forward end of the frame may be brought up nearer to or let down further from the tongue, thereby elevating or depressing the points of the fingers and cutters and the cutting apparatus itself, as may be desired. When the frame is elevated for reaping or other purposes, the lever is held by means of the swinging rack and the rock-shaft or axle, through which the frame is raised and lowered, as described, being prevented from rotating, the frame is securely held, locked to the axle and to the hinged tongue in such manner as to prevent any movement of the cutting apparatus up and down except what is due to the vibrations of the tongue and axle in passing over uneven ground, and the machine becomes, for all practical purposes, a rigid frame and stiff tongue machine. When, however, the lever is released from the holding rack, the axle is free to turn with the vibrations of the frame, and the cutting apparatus is free to follow the undulations in the surface of the ground over which it is drawn, independently of the vibrations of the tongue and axle, and the machine becomes a vibrating frame and hinged tongue machine.

What I claim, and desire to secure by Letters Patent, is—

The combination of the main frame of the machine with the tongue and main axle in such manner that said frame may be raised and lowered bodily, maintaining its parallelism with or relation to the ground at whatever height therefrom it may be adjusted or set, substantially as described.

I also claim the combination of a pivoted swinging yoke with a segmentally slotted frame, arranged to slide up and down on the main axle, substantially as described.

I also claim the combination of geared segments with a segmentally slotted frame, which is adjusted up and down on the axle, substantially as described.

I also claim the main axle provided with pinions and made to operate as a rock-shaft, by which, through geared segments or their equivalents, to raise and lower the slotted frame, substantially as described.

I also claim the pivoted swinging yoke in combination with the tongue and slotted frame, substantially as described.

I also claim a swinging yoke attached to the tongue and frame, made adjustable for varying the movements of the frame in raising and lowering the cutters, substantially as described.

WM. F. COCHRANE.

Witnesses:
 N. B. SMITH,
 EDM. F. BROWN.